Aug. 4, 1959     C. KRASTCHEW     2,898,484
REFRIGERATION COOLING OF ELECTRICAL MACHINES
Filed Aug. 23, 1954     2 Sheets-Sheet 1
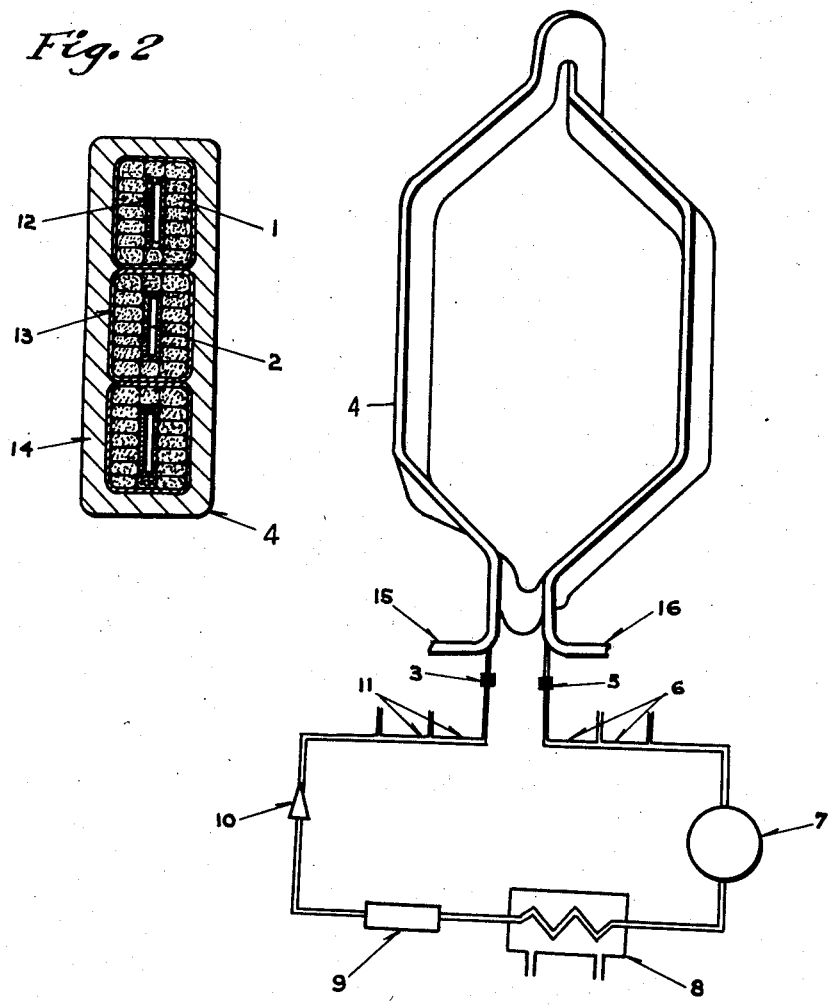
INVENTOR.
CHRISTOSLAW KRASTCHEW
BY Aug. 4, 1959

C. KRASTCHEW 2,898,484

REFRIGERATION COOLING OF ELECTRICAL MACHINES

Filed Aug. 23, 1954

INVENTOR.
CHRISTOSLAW KRASTCHEW
BY

United States Patent Office 2,898,484
Patented Aug. 4, 1959

2,898,484

REFRIGERATION COOLING OF ELECTRICAL MACHINES

Christoslaw Krastchew, Sao Paulo, Brazil

Application August 23, 1954, Serial No. 451,625

Claims priority, application Brazil January 19, 1952

7 Claims. (Cl. 310—52)

The present invention which is a continuation in part of my application Serial No. 331,594, filed January 16, 1953, now abandoned, relates generally to the cooling of rotating electrical machines and has reference particularly to the cooling of the stator and rotor windings.

The maximum current carrying capacity of the stator and rotor windings depends upon the maximum permissible operating temperature of the electrical machine and the ability of the cooling system to dissipate the heat loss generated within the insulation of its windings.

The existing cooling systems usually depend upon blowing cold air or hydrogen, directed by baffles and ducts to pass over the hot parts of the electrical machine, then the heat of the hot air or hydrogen is extracted by passing it through coolers prior to repeating the same cycle. During the recent years other new methods of cooling electrical machines have been advocated and proposed at least on paper. Much work has been done relating to the improvement of the rotor cooling. However, the methods which have been already used and others proposed, are, in general, limited to cooling circuit external to the insulated rotor winding itself. In all these improvements the general idea was the introduction of new slots or ducts adjacent to the windings, or the introduction of a new coolant, other than hydrogen, such as vaporizable or non-vaporizable liquid. Years ago electrical machines were also built with liquid cooled stator core and embedded winding with treated water circulated in hollow cooling pads sandwiched between the lamination packages of the core. A heat exchanger outside of the machine is provided for cooling the liquid after leaving and before entering the machine again.

All these methods brought some improvements, but in no way solved the cooling problem of the electrical windings or the electrical machines respectively. The simple reason for this is that the heat generated in the copper conductor of the windings is removed, after it has passed through the different winding insulation, usually composed of the strand, the turn, if any, and the ground insulation. Since insulation materials have a very low coefficient of thermal conductivity, the temperature gradient in the insulation for standard stator and rotor winding in hydrogen may vary from 35 to 65 percent of the total temperature drop, the rest occurs across core, ducts gas, etc. Much thought and work has been given to increase the hydrogen pressure for obtaining better cooling. This method, however, reduced the thermal resistance only of the smaller part of the thermal circuit, and does not reduce the thermal resistance of the greater part of the thermal circuit i.e. in the winding insulation.

From the above it is evident that the best results for increasing the current carrying capacity of a given winding, respectively of a given machine can be only achieved by direct contact of an effective coolant with the copper. In recent years some electrical machines have been constructed with hollow rotor windings, to take advantage of the internal cooling. In this type of windings large masses of hydrogen gas are passing from the winding ends to internal passages of the conductors and are discharged through radial central openings at relatively high velocity. This type of cooling requires high hydrogen pressures, which require high pressure blowers to circulate the gas. It is evident that the higher the hydrogen pressure, the better is the cooling effect, but the windage losses would be greater. If stator windings are cooled in the above way and especially if central discharge is needed, the insulation problem is more difficult, due to the required higher hydrogen pressure and due to the higher voltage usually encountered in the stator windings, than in the rotor windings. Some designs in order to take full advantage of the higher hydrogen pressure for cooling stator winding with discontinuous winding insulation, have been provided with separate stator and rotor chambers, by means of a stiff cylinder of insulating material which extends through the airgap-bore. This would require greater air gap than normal, thus increasing the field amper-turns. By separation of the machine space into stator and rotor chambers full advantage is taken of the higher hydrogen pressure for the stator cooling and the lower pressure prevailing in the rotor chamber is responsible for lower windage losses. For certain liquid cooled stator winding machine, the same separation of the machine space in rotor and stator chamber is advocated too.

The object of my invention is to provide suitable means and design which will enable direct removing of the heat generated in the winding copper strands by means of circulation of an efficient coolant, other than hydrogen, such coolant being a vaporizable liquid, which, in contact with the hot conductor, vaporizes removing the heat generated in the windings, all this by means of axially arranged canals within the copper conductor.

Another object of this invention is to provide simple and efficient means for removing the heat generated inside the copper strand of the winding, without letting the heat to pass through the winding insulation and at the same time without the necessity of having discontinuous or broken winding insulation, taking in this way full advantage of the excellent solid dielectric barriers in the winding slots which is of utmost importance for an economical machine design.

Another object of my invention is to provide means and design for cooling, with equal facilities, the stator and the rotor windings with the above mentioned coolants, but without the necessity of having a gas-proof machine housing or a machine housing with two separate stator and rotor chambers as it seems to be indispensable with some other schemes for internal cooling.

Another object of this invention is to provide means and design for cooling of the stator and rotor windings of an electrical machine by which the heat-losses of the windings are removed at a rate which is several times greater than with the conventional ways of cooling, thus, in combination with other existing methods for removing the heat from the iron core, it will contribute greatly for increasing rated capacity of a given physical size machine.

These and other objects of my invention and the various features and combination of parts, design and methods are hereafter described and claimed, and illustrated in the accompanying drawings in which:

Fig. 1 is a diagrammatic representation of a three turn stator winding as connected to the cooling system by means of insulating pipes, or bushings.

Fig. 2 is a cross section of the same windings with inserted cooling duct among the winding copper strands, according to the invention.

Figure 3:
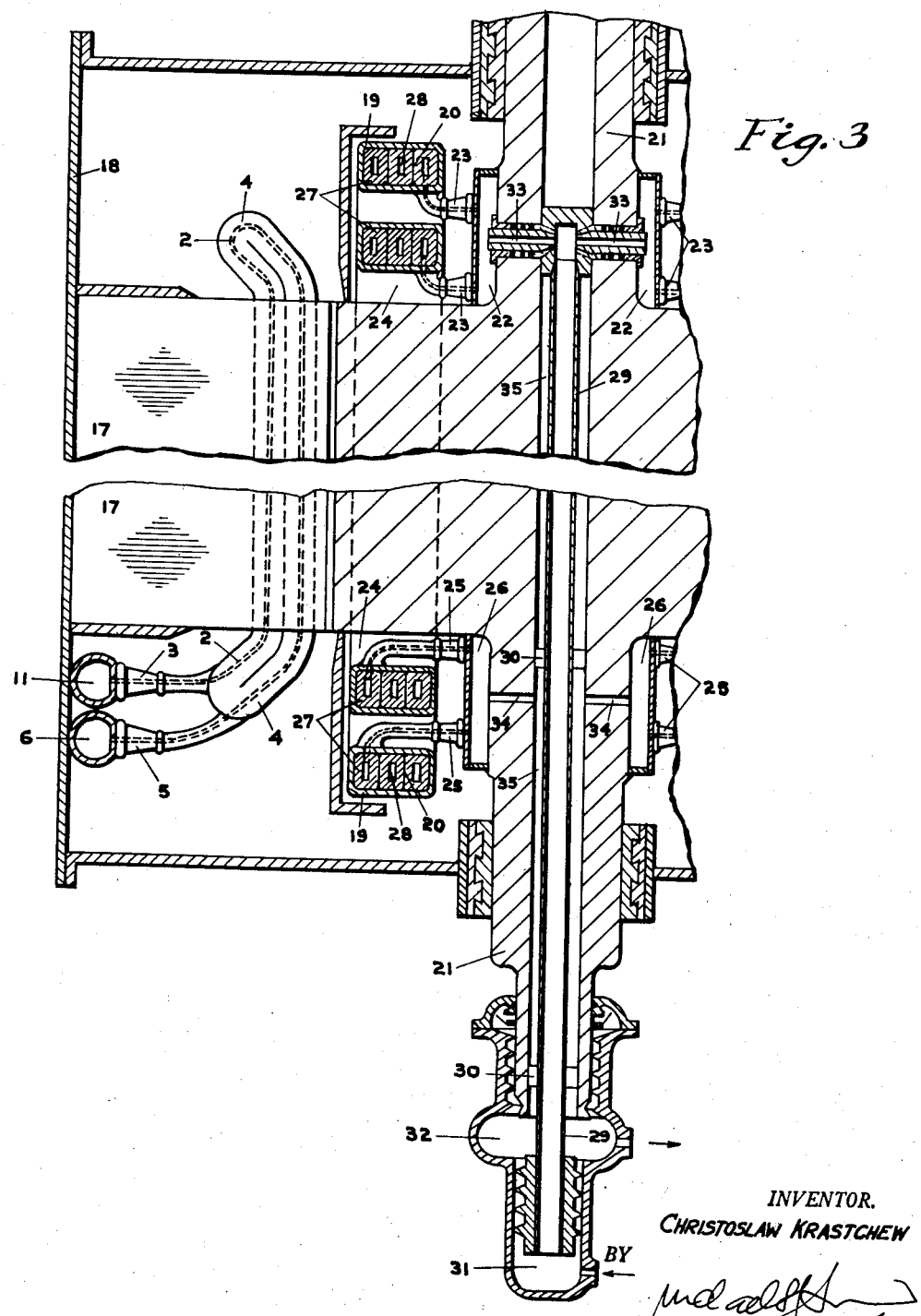
Fig. 3 is a reduced scale diagrammatic longitudinal section of an electrical machine, showing in illustrative way how the main idea of the present invention, as revealed in Figs. 1 and 2, can be incorporated in a practical machine for cooling the stator and rotor windings of the same, according to the invention.

In Figs. 1 and 2, I have illustrated my general idea of internal cooled three turn stator winding 4 as arranged for removal of the heat from the points of its generation, i.e. from the conductor copper strands 1. The copper strands 1 of the winding 4 are assembled in such a way as to form hollow space 2 throughout the winding length. This hollow space 2 is actually the place, where the coolant comes in direct contact with the generated heat and is completely removed from the winding conductor, without passing through the turn insulation 13 and ground insulation 14. For simplicity's sake and better understanding, the hollow space 2 is shown in Fig. 2, as accomplished by a rectangular cooper tube 12. The hollow space 2, however, can be accomplished in other ways, as it will be subsequently described. At one end of the winding the hollow space 2, or better said, the copper tube 12 is mechanically connected by means of a pipe or a bushing 5 of high dielectric strength to the outgoing header 6, the said header is then connected to one side of the actual cooling system. The other side of the said cooling system through the incoming header 11 is mechanically connected to the other end of the hollow space 2, or better said, of the copper tube 12 again by means of a pipe or a bushing 3 of high dielectric strength. The electrical connections of the incoming conductor end 15, and the outgoing end 16 of the winding 4 are made in a usual way or as might be required.

The actual cooling system can be placed at any convenient place inside or outside the machine housing and is composed of different standard components, depending upon the coolant to be handled, but for matter of simplicity it is shown in Fig. 1 composed only of the main components, such as the high-pressure pump 7, the heat-exchanger 8, the liquid receiver 9 and the regulating valve 10. The fact that these components make parts of every standard equipment for vaporizing cooling system and the fact that their principles are well known, require no further explanations.

Fig. 2 shows the cross section of the proposed winding 4 with hollow space 2 among the copper strands 1, where the said hollow space 2 is accomplished by inserting a rectangular copper tube 12. This, although not being the best solution from thermal and electrical standpoints, was chosen here to illustrate in a better and an easily understandable way the main idea of directly connected hollow space 2. However, a practical machine with winding 4 as proposed, will have many rectangular shapes, or any other shape, copper tubes 12 inserted among the copper strands 1. Even a more perfect design for the proposed hollow space 2 from electrical and thermal standpoints will be the one in which the hollow space 2 is formed when rectangular or any other shape tubular copper strands are used for construction of the winding conductor. The design, in which all or part of the copper strands are tubular, is the best one, because the space to be occupied by the coolant in the tubular copper strands is electrically less effective, due to the skin effect. It is evident that this design secures the best solution in providing an economical hollow space 2, making the proposed scheme highly advantageous. Hollow strands can be used in Roeber transposition arrangement too.

Fig. 3 shows how the main idea schematically illustrated in Fig. 1 can be incorporated in a practical electrical machine for cooling the stator and rotor windings. The stator member 17 is supported within the machine housing 18. The incoming header 11 in the form of a ring or other manifold type, is supported within the machine housing 18. From this header 11 the coolant passes through the insulating incoming bushings 3 entering the hollow space 2 of the windings 4. The insulating bushings 5, through which the coolant leaves the hollow space 2 of the windings 4 to enter again the cooling system through the outgoing header 6, constructed in a similar way as the incoming header 11, are shown to be mounted on the same machine end. The electrical connections of the machine are therefore to be made on the opposite side of the machine which seems to be the most logical arrangement. If, however, other arrangements for some special reason are required, such as having the outgoing header 6 and bushings 5 on one side of the machine and the incoming header 11 and bushings 3 on the other side, this would be possible, without deviating from the main idea of this invention.

It is evident that the presented method of cooling as illustrated in Fig. 1 is easily applicable for cooling of the rotor windings 24 with the difference that the coolant will be supplied to the rotor windings 24 through the hollow shaft 21 of the machine. Fig. 3 shows a way how this can be accomplished, although it is not the scope of this invention to propose means and design for it. A pipe 29 is inserted in the hollow shaft 21 and centered in its position by means of distancers 30. One end of the pipe 29 is connected by means of the cross pipes 33 to the incoming header 22 and the other end is projected into the incoming chamber 31. The space 35 confined between the external surface of pipe 29 and the internal surface of the hollow shaft 21 is connected by canals 34 to the outgoing header 26 and at the other end with the outgoing chamber 32. The refrigerated coolant enters the internal space of pipe 29 through the incoming chamber 31 and through canals 33 enters the incoming header 22. Thereafter, through the insulating incoming bushings 23, enters the hollow space 28 in the copper straps 27 of the rotor windings 24. Here, in contact with the hot copper straps 27, the coolant evaporizes, collecting the generated heat, thereafter leaving the hollow space 28 through the insulating bushings 25 to enter the outgoing header 26. By means of canals 34, space 35 and the outgoing chamber 32, the coolant enters the cooling system. The cooling system is placed inside or outside of the machine housing. It may be the same one used for the stator cooling, but it also may be a separate one for independent rotor cooling.

Since the rotor windings 24 are subject to lower voltages than the stator winding 4, the insulation problem is easier. The rotor windings 24 are constructed with one or more turns made of copper or other non-ferrous metal tubular straps and are provided with the turn insulations 20 and ground insulation 19. In order to keep down the coolant pressure drop in the rotor windings 24 usually connected electrically in series, it may be necessary to have the hollow spaces 28 of many winding turns mechanically connected in parallel, independent of their electrical connection. Furthermore, the incoming header 22 and bushings 23 can be placed on the same rotor side with the outgoing header 26 and bushings 25, if some special construction reasons require that.

I hereby also propose a new arrangement which is a combination of stator and rotor internally cooled windings as presented by the inventor, or stator and rotor internally cooled by any other method, together with similar internal cooling of stator and rotor core for removing the iron heat losses (the latter subject and claimed by previous patents). In this way very efficient cooling of an electrical machine can be achieved without the necessity of using high-density hydrogen but giving up hydrogen entirely. Therefore, to make up for the quality of the hydrogen as a reducer of the windage losses, I propose a machine cooled as described above and constructed with an air vacuum-proof, but not explosion-proof, machine housing in which the air is pumped out, to maintain certain vacuum in the machine housing. The reduced air pressure in the machine housing will provide the required reduction of the windage losses and noise in high speed machines. This proposed arrangement will dispense with all complicated hydrogen handling and control equipment used in the present practice. Furthermore, many additional advantages will be obtained with this proposed arrangement which will permit giving up entirely hydrogen as a coolant of the electrical machines.

Another variation of the above cooling arrangement is to construct the electrical machine with gas proof housing, and not explosion proof housing in which low pressure of any windage reducing and non-explosive gas is maintained to service as windage reducer only.

While I have illustrated my invention in simple illustrative form of embodiment, I wish it to be understood that my invention is subject to various changes, arrangements and combinations that may be desirable, but without deviating from the essential idea thereof, and embodied therein within the scope of the following claims.

I claim:

1. In a dynamoelectric machine, in combination, a rotor formed with a substantially axial channel therein extending throughout a major portion of the axis of said rotor; a plurality of electrical windings mounted on said rotor, each of said windings being respectively formed with a conduit therein extending from one end of its respective winding to the other end thereof for the passage of a coolant therethrough; a plurality of first electrical insulating means, each of said first electrical insulating means being mounted respectively at said one end of one of said plurality of windings and being formed with a passage therein communicating with its respective conduit; a plurality of second electrical insulating means, each of said second electrical insulating means being mounted respectively at said other end of one of said plurality of windings and being formed with a passage therein communicating with its respective conduit; tubular inlet means disposed in said axial channel of said rotor and having an outer diameter smaller than the diameter of said channel to form an annular space therebetween; means communicating with said tubular inlet means and said plurality of first electrical insulating means and adapted to be connected through said inlet means to a source of refrigerant coolant under pressure having a high latent heat of evaporization whereby the flow of coolant through said inlet means, communicating means and each of said conduits in said windings causes vaporization of the coolant from any heat in said windings; and means communicating with said plurality of second electrical insulating means and said annular space between said tubular inlet means and said channel of said rotor for emitting the vaporized coolant, whereby the coolant flows only through said conduit and the means connected thereto without coming in contact with any other parts of the machine.

2. In a dynamoelectric machine, in combination, a rotor formed with a substantially axial channel extending throughout a major portion of the axis of said rotor and a plurality of annular chambers therein; a plurality of electrical windings mounted on said rotor, each of said windings being respectively formed with a first conduit therein extending from one end of its respective winding to the other end thereof for the passage of a coolant therethrough; a plurality of first electrical insulating means, each of said first electrical insulating means being mounted respectively at said one end of one of said plurality of windings and being formed with a passage therein communicating with its respective first conduit and one of said annular chambers; a plurality of second electrical insulating means, each of said second electrical insulating means being mounted respectively at said other end of one of said plurality of windings and being formed with a passage therein communicating with its respective first conduit and a second of said annular chambers; tubular inlet means disposed in said axial channel of said rotor and having an outer diameter smaller than the diameter of said channel to form an annular space therebetween; a plurality of spaced radial conduits connecting said tubular inlet means to said one of said annular chambers and adapted to be connected through said inlet means to a source of refrigerant coolant under pressure having a high latent heat of evaporization whereby the flow of coolant through said inlet means and each of said conduits in said windings causes vaporization of the coolant from any heat in said windings; and connecting means communicating with said annular space between said tubular inlet means and said channel of said rotor and said second of said annular chambers for emitting the vaporized coolant, whereby the coolant flows only through said conduits and said means connected thereto without coming into contact with any other parts of the machine.

3. In a dynamoelectric machine, in combination, a rotor formed with a substantially axial channel therein extending throughout a major portion of the axis of said rotor; a plurality of electrical windings mounted on said rotor, each of said windings being respectively formed with a conduit therein extending from one end of its respective winding to the other end thereof for the passage of a coolant therethrough; a plurality of first electrical insulating means, each of said first electrical insulating means being mounted respectively at said one end of one of said plurality of windings and being formed with a passage therein communicating with its respective conduit; a plurality of second electrical insulating means, each of said second electrical insulating means being mounted respectively at said other end of one of said plurality of windings and being formed with a passage therein communicating with its respective conduit; tubular inlet means disposed in said axial channel of said rotor and having an outer diameter smaller than the diameter of said channel to form an annular space therebetween; casing means mounted at one end of said tubular inlet means and being formed with an inlet communicating with said tubular inlet means and an outlet communicating with said annular space between said tubular inlet means and said channel; means communicating with said tubular inlet means and said plurality of first electrical insulating means and adapted to be connected through said inlet means and said inlet in said casing to a source of refrigerant coolant under pressure having a high latent heat of evaporization whereby the flow of coolant through said inlet means, communicating means and each of said conduits in said windings causes vaporization of the coolant from any heat in said windings; and means communicating with said plurality of second electrical insulating means and said annular space between said tubular inlet means and said channel of said rotor for emitting the vaporized coolant through said outlet in said casing whereby the coolant flows only through said conduit and the means conected thereto without coming in contact with any other parts of the machine.

4. In a dynamoelectric machine, in combination, a stator having an electrical winding adapted to be internally cooled; a rotor formed with a substantially axial channel therein extending throughout a major portion of the axis of said rotor; a plurality of electrical windings mounted on said rotor, each of said windings being respectively formed with a conduit therein extending from one end of its respective winding to the other end thereof for the passage of a coolant therethrough; a plurality of first electrical insulating means, each of said first electrical insulating means being mounted respectively at said one end of one of said plurality of windings and being formed with a passage therein communicating with its respective conduit; a plurality of second electrical insulating means, each of said second insulating means being mounted respectively at said other end of one of said plurality of windings and being formed with a passage therein communicating with its respective conduit; tubular inlet means disposed in said axial channel of said rotor and having an outer diameter smaller than the diameter of said channel to form an annular space therebetween; means communicating with said tubular inlet means and said plurality of first electrical insulating means and adapted to be connected through said inlet means to a source of refrigerant coolant under pressure having a high latent heat of evaporization whereby the flow of coolant through said inlet means, communicating means and each of said conduits in said windings causes vaporization of the coolant from any heat in said windings; and means communicating with said plurality of second electrical insulating means and said annular space between said tubular inlet means and said channel of said rotor for emitting the vaporized coolant whereby the coolant flows only through said conduit and the means connected thereto without coming in contact with any other parts of the machine.

5. In a dynamoelectric machine, in combination, a rotor formed with a first and a second channel therein extending throughout the major portion of the length of said rotor; a plurality of electrical windings mounted on said rotor, each of said windings being respectively formed with a conduit therein extending from one end of the respective winding to the other end thereof; a plurality of first electrically insulating passage means mounted on said rotor and each communicating at one end with one end of a conduit in said windings and at the other end with said first channel; and a plurality of second electrically insulating passage means mounted on said rotor and each communicating at one end with the other end of a conduit in said windings and at the other end with said second channel, whereby coolant may enter through said first channel, pass through said first electrically insulating passage means into said conduits in said electrical windings and, after cooling thereof, pass through said second electrically insulating passage means into said second channel.

6. A dynamoelectric machine as defined in claim 5 in which said conduit is directly formed from the metal of said windings, respectively.

7. A dynamoelectric machine as defined in claim 5 in which each of said windings includes a plurality of metal strands and in which said conduit is formed by a metal tube surrounded by and in intimate contact with said metal strands of said windings, respectively.

References Cited in the file of this patent

UNITED STATES PATENTS

| 865,617 | Steinmetz | Sept. 10, 1907 |
| 1,001,643 | Howell | Aug. 29, 1911 |
| 1,145,612 | Porter | July 6, 1915 |
| 1,285,398 | Rudenberg | Nov. 19, 1918 |
| 1,448,700 | Seidner | Mar. 13, 1923 |
| 1,761,387 | Gay | June 3, 1930 |
| 1,959,527 | Ehrmann | May 22, 1934 |
| 2,381,122 | Fechheimer | Aug. 7, 1945 |
| 2,390,130 | Sigmund | Dec. 4, 1945 |
| 2,561,737 | Hill | July 24, 1951 |
| 2,695,368 | Kilbourne | Nov. 23, 1954 |
| 2,722,616 | Moses | Nov. 1, 1955 |
| 2,752,515 | Baudry | June 26, 1956 |

FOREIGN PATENTS

| 16,590 | Great Britain | of 1914 |
| 557,216 | Great Britain | Nov. 10, 1943 |
| 836,060 | Germany | Apr. 7, 1952 |

OTHER REFERENCES

Power Engineering, vol. 57, No. 8, published Aug. 1953, pp. 98, 99, 100.